Dec. 1, 1953  W. B. STEWART  2,661,094
VARIABLE VOLUME SEPARATOR FOR LIQUIDS
Filed Oct. 3, 1950  2 Sheets-Sheet 1

Inventor: William B. Stewart
By: Oswald H. Milmore
His Attorney

Dec. 1, 1953 W. B. STEWART 2,661,094
VARIABLE VOLUME SEPARATOR FOR LIQUIDS
Filed Oct. 3, 1950 2 Sheets-Sheet 2

Inventor: William B. Stewart
By: Oswald H Wilmore
His Attorney

Patented Dec. 1, 1953

2,661,094

UNITED STATES PATENT OFFICE 2,661,094

VARIABLE VOLUME SEPARATOR FOR LIQUIDS

William B. Stewart, Scarsdale, N. Y., assignor to Shell Development Company, San Francisco, Calif., a corporation of Delaware Application October 3, 1950, Serial No. 188,120

6 Claims. (Cl. 210—54)

This invention relates to devices for separating liquids by settling wherein the settling space is variable in accordance with the volume of liquid in the separator. More particularly, it is concerned with a separator for skimming off a supernatant liquid which rises from a volumetrically greater body of denser liquid.

Efforts toward improved technique in the separation and recovery of oils from refinery waste streams have gained momentum both as a result of increasing emphasis placed by governmental authorities on prevention of harbor and stream pollution and because of the growing complexity of modern refinery operations. The latter particularly has brought about a trend to providing each process or group of allied processes with its own small individual separator or recovery system which would function on the waste stream prior to passing the latter to the conventional large centralized separator system.

A major disadvantage of the conventional centralized system which processes the effluents from several widespread unit processes is that the recovery oil usually comprises a complex admixture of the various products. In general, when recovered these oils have completely lost their identity and the resultant mixture has at the most only marginal crude oil value regardless of any premium value the individual components may have had.

A difficulty in applying individual separators for the unit processes has been the unsuitability of known separators to operate satisfactorily at varying levels or without the close supervision of an operator. The customary type of separator box is, moreover, not suitable mainly on account of the serious hazard of introducing relatively large surface exposures of volatile and/or inflammable material within the process operating areas, and the use of a settler having a cover which is maintained in continuous contact with the liquid to minimize a vapor space would be highly desirable.

It is the general object of this invention to overcome the disadvantages noted above and to provide an improved separator adapted for handling liquids in variable volumes for skimming therefrom varying, usually relatively small, amounts of lighter liquids, such as oils, which are dispersed or entrained with a heavier liquid. A further object is to provide a separator having an improved, vertically movable roof which forms a top closure which minimizes the exposure of inflammable materials. Still another object is to provide a separator which is adapted to continue its normal separating function when gases such as air or inflammable vapors are entrained in the incoming liquids, although the invention is not limited to use with plant effluents which contain volatiles.

In summary, according to the invention there is provided a sedimentation or settling vessel, preferably elongated, having an inlet for supplying a liquid mixture to be settled and an outlet for discharging the denser liquid after sedimentation, the inlet and outlet being preferably at opposite ends; a roof at least a part of which is vertically movable in accordance with the contents of the settler, preferably a pontoon roof constructed to float on the liquid; and a skimmer a short distance beneath the roof and vertically movable therewith, preferably suspended therefrom, for receiving supernatant liquid after sedimentation. To further facilitate collection of relatively small amounts of the lighter liquid I prefer to incline the lower face of the roof wall which is in contact with the liquid, in any suitable shape to decrease the horizontal area of the settling space progressively towards the top; in the preferred embodiment to be described this is effected by forming the roof of two inclined planes intersecting along a central ridge extending lengthwise with respect to the settler, although this specific arrangement is not in every case essential. The skimmer is then conveniently in the form of a trough extending beneath the said ridge and open at the top, although any type of skimmer, e. g., a tube with lateral perforation for the inflow of supernatant liquid may be used.

The skimmer is provided with a drain for the supernatant liquid which is preferably connected to a recovery tank wherein the withdrawn liquid is maintained at a predetermined level to effect control over the back pressure in the drain and thereby regulate the flow of supernatant liquid.

The invention will be further described with reference to the accompanying drawing forming a part of this specification and illustrating two preferred embodiments by way of illustration, wherein.

*Description of the first embodiment*

Figure 1:
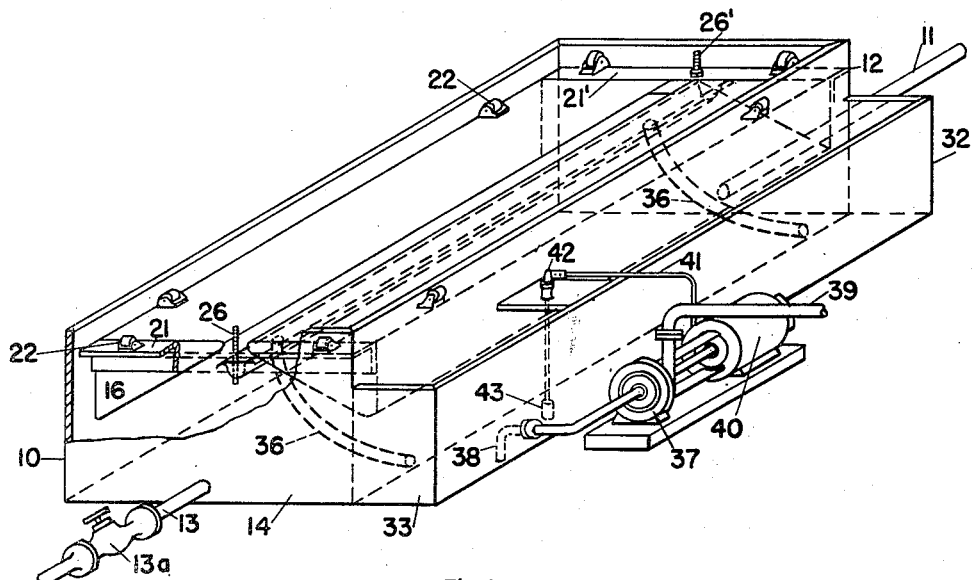
Fig. 1 is an isometric view of the separator with the cover removed.
Figure 2:
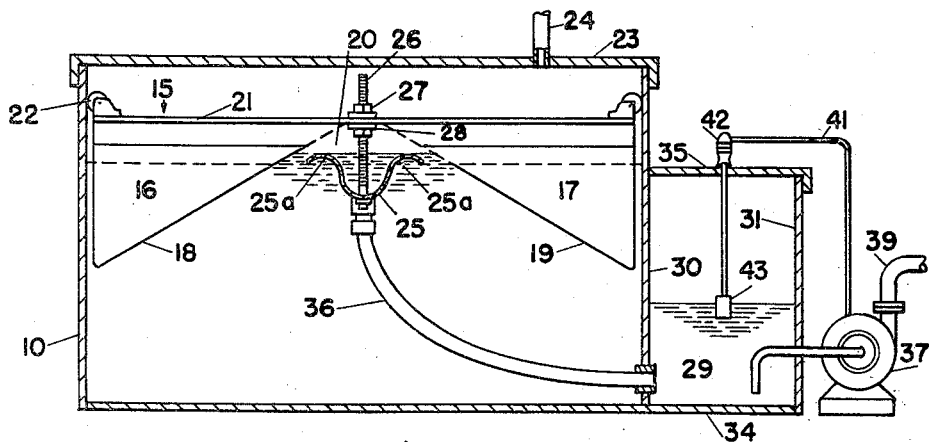
Fig. 2 is a transverse sectional view of the same separator, looking at the front end of the floating roof.

Referring to Figs. 1 and 2 of the drawings in detail, there are shown an elongated sedimentation or settling vessel in the form of a rectangular box 10 having bottom, side and end walls, a waste effluent inlet pipe 11 at the inlet end 12 and an outlet pipe 13 for settled heavy liquid at the end 14. The pipe 13 may optionally be provided with effluent flow control means of any suitable type, for maintaining liquid in the settling vessel to a suitable level; such flow control means are generically indicated by the valve 13a, it being understood that such valve may be operated manually or provided with known devices for automatic operation, e. g., a liquid level control device actuated by the height of the floating roof 15, for maintaining a more or less constant liquid level in the settling vessel. The floating roof 15 comprises a pair of pontoons 16 and 17, having triangular cross sections to form inclined lower roof walls 18 and 19 which are in contact with the liquid in the vessel. The planes of the lower faces of these walls intersect at or near center to form a crown or ridge thereat, and define a confined collecting space 20 which extends the full length of the roof between the ends 12 and 14. The pontoons are connected by angle irons 21, 21', which extend transversely at the ends of the pontoon. A vent opening may be provided at or near the highest point of the space 20 for the escape of volatile material, such as gases or air, that may be liberated from the liquids. According to one convenient arrangement of the vent, illustrated in Fig. 1, the pontoons are spaced apart slightly to leave a longitudinal gap above the space 20 extending the full length of the space. A plurality of guide rollers 22 are mounted on the deck plate for engaging the side walls of the vessel, the rollers at the ends of the roof being mounted on structural angles 21, 21'. A top closure 23 with a vapor outlet pipe 24 may optionally be mounted on the box, but such a closure is in many applications not required.

A skimming trough 25, having closed ends, is mounted in the collecting space 20 and suspended from the angles 21, 21' by hanger bolts 26, 26'. These bolts have nuts 27, 28 threadedly connected thereto by which the heights of the bolts with respect to the angles 21, 21', and, hence, the height of the skimming trough may be adjusted. The highest parts 25a of the trough are herein referred to as the skimming edges.

The recovery vessel 29 is preferably made a part of the separator proper as described to this point; thus, it may be formed between the longitudinal side wall 30 of the settling vessel and a parallel wall 31, and be provided further with end walls 32 and 33, and a bottom 34. A fixed roof 35 is optionally provided. The recovery vessel is connected to the skimming trough by a plurality of drain conduits of any type permitting relative motion between the trough and the vessel, e. g., light flexible hose sections 36, 36' connected at their ends to the trough and to the wall 30.

The recovery vessel forms a reservoir in which skimmed liquid is collected. This liquid is discharged through a pump 37 taking suction through a pipe 38 opening near the bottom of the vessel and delivering liquid to a discharge pipe 39. The pump is driven by an electric motor 40 controlled by suitable electrical conduits 41 from a control switch 42 which is actuated by an internal float type controller of known type and having a float 43 which may be vertically adjusted. It is thereby possible to maintain the liquid level in the recovery vessel at any desired height in accordance with the rates of flow of the liquids and their relative densities. It will be noted that the liquid level in the recovery vessel is lower than the level of the trough with the floating roof in its lowermost position.

*Operation of the first embodiment*

The outlet valve 13a may be initially closed and liquid to be treated is introduced into the vessel 10 through pipe 11 until the roof 15 assumes a position raised from the bottom of the settling vessel; thereupon the valve 13a may be fully or partially opened. Sedimentation occurs within the vessel. As applied, for example, to the recovery of oil from waste water containing a minor amount of entrained oil, the oil rises to the top, being deflected into the confined collecting space 20 by the inclined walls 18 and 19. Clarified or partly clarified water is withdrawn through the pipe 13 and the oil overflows into the skimming trough 25. Volatiles, when present, escape through the gap between the walls 18 and 19, and, when the optional cover 23 is provided, may be discharged through the pipe 24. It is not necessary to maintain a constant level within the vessel 10 because the roof will rise and fall as the rate of admission of the liquid mixture changes from time to time. This makes it unnecessary to adjust the valve 13a at frequent intervals; in fact, it is possible to omit this valve entirely.

Skimmed oil flows through the flexible hose 36, 36' into the recovery vessel 29 from which it is discharged intermittently or continuously by the pump 37 in accordance with the operation of the level-controlled switch 42 for maintaining a predetermined liquid level.

In this construction the progressive decrease in the horizontal area of the settling chamber, brought about by the inclined walls 18 and 19, greatly increases the effective thickness of the lighter liquid and facilitates skimming. Another desirable feature is the "automatic skimming" brought about by the buoyancy of the pontoon roof which supports the skimming trough. By initially adjusting the trough through its hanger bolts 26, 26' so that the skimmer edges 25a are at, or slightly above, the liquid surface when the settling vessel contains only the heavier liquid, the flow of the heavier liquid into the skimmer is prevented. As the thickness of the supernatant layer of the lighter liquid increases, the total volumetric displacement of the pontoons in both heavier and lighter liquids increases in accordance with Archimedes' principle, so that the skimmer edges are lowered to beneath the surface of the lighter liquid; this results in a flow of light liquid into the skimmer. Conversely, as the thickness of the supernatant layer decreases, the volumetric displacement of the floating roof decreases and the skimmer is raised until the edges thereof are at the same elevation as the liquid level when there remains only a thin layer of lighter liquid at the surface. The floating roof thereby acts as an automatic control for the skimmer which is effective regardless of volumetric contents of the settler. The need for a careful control of the liquid level within the settler is thereby obviated.

*Description of the second embodiment*

Figure 3:
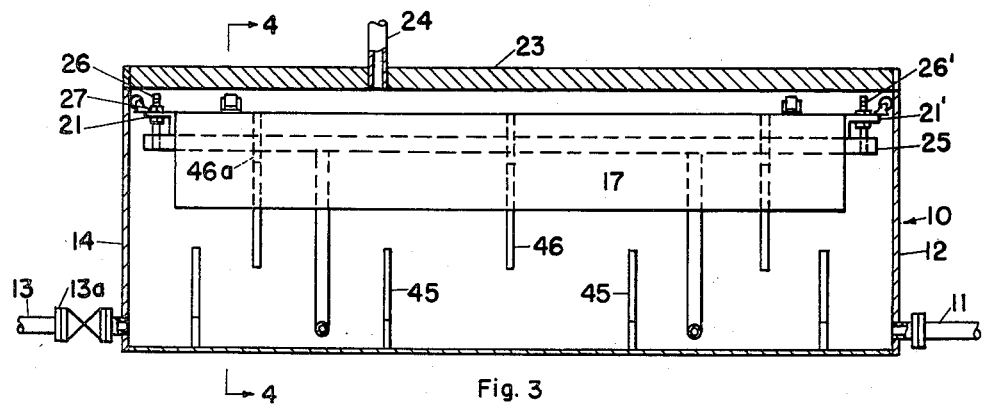
Figs. 3 and 4 are longitudinal and transverse sectional views of a modified separator using baffles.
Figure 4:
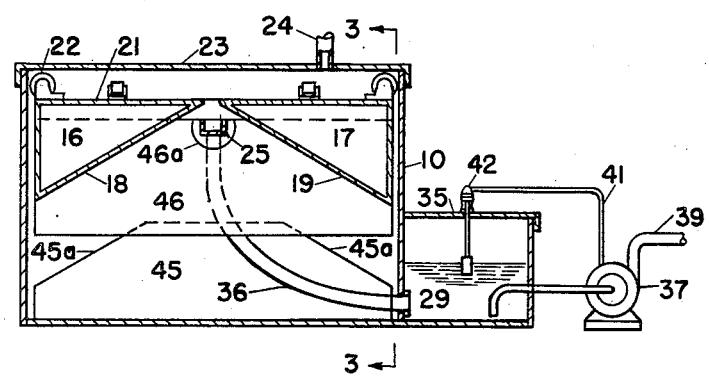

Referring next to Figs. 3 and 4 of the drawings, there is shown a modified settler provided with transverse baffles arranged to require under-and-over flow of the liquid to facilitate coalescence of the droplets of lighter liquid and minimize entrainment of supernatant liquid, the baffles being arranged so as not to obstruct the vertical movement of the pontoons. This settler is provided with a settling vessel 10 and a recovery vessel 29 for lighter liquid, having inlets and outlets, liquid flow control means, a floating pontoon roof, a skimmer adjustably mounted on the roof, and a light-liquid draw-off, all as previously described for the first embodiment, and the description of these parts need not be repeated; for clarity, certain of these parts are designated in Figs. 3 and 4 by like reference numbers.

A plurality of transverse baffles 45 are fixed in the bottom of the box 10. The upper edges of the baffles are preferably shaped to conform to the inclination of the lower faces of the roof walls 18 and 19, e. g., by inclining the marginal portions 45a and 45b. The maximum permissible vertical movement of the pontoon is thereby limited as indicated by points A and B in Fig. 4, the roof being illustrated in the uppermost position. Another series of transverse movable baffles 46, located intermediate each pair of adjacent baffles 45, are fixed to the roof walls 18 and 19 and depend therefrom; these baffles are of such vertical heights as to cause their lower, horizontal edges to engage the bottom of the box 10 when the roof is at the lowermost position. Notches 46a in the upper parts of these baffles accommodate the skimming trough 25 and are large enough to permit the latter to be adjusted vertically.

*Operation of the second embodiment*

The skimmer is adjusted and the settler operates in the manner previously described for the first embodiment. The liquid admitted through the inlet 11 flows successively over the baffles 45 and under the baffles 46, thereby assisting in coalescing the droplets of lighter liquids. Moreover, supernatant lighter liquid will be trapped by the baffles 46 and prevented from being carried along with the stream of heavier liquid. A layer of light liquid can thereby accumulate gradually until the thickness thereof is sufficient to cause the skimmer edge to be submerged therein for discharging the light liquid into the skimming trough in the manner previously described. Equalization of the thickness of the supernatant layer is possible by flow through the notches 46a. These baffles will not interfere with the free vertical movement of the roof.

I claim as my invention:

1. A variable volume separator comprising an elongate settling vessel having walls at least the upper portions of which extend vertically; a floating roof movable vertically within said walls having pontoon means for floating on liquid in said vessel and having at least one part thereof at a level to be immersed in said liquid and inclined to form a confined collecting space of reduced horizontal area for supernatant liquid, said space extending longitudinally with respect to said vessel; an inlet at one end of the vessel for introducing a liquid mixture to be separated; an outlet at the other end of the vessel for discharging settled denser liquid from the vessel after traversing the length thereof; a skimmer in said collecting space having an elongate skimming edge extending longitudinally with respect to the vessel and being vertically movable with said roof for receiving supernatant liquid; and means for drawing off supernatant liquid from said skimmer.

2. The separator according to claim 1 wherein the skimmer is carried by and is vertically adjustable with respect to said roof.

3. The separator according to claim 1 wherein the means for drawing off supernatant liquid from the skimmer comprises a movable conduit extending downwardly from the skimmer through the interior of said vessel and communicating with a point outside of the vessel.

4. In combination with the separator according to claim 1, one or more transverse stationary baffles rising from the bottom of the settling vessel and one or more transverse movable baffles depending from said roof and spaced from said stationary baffles, whereby liquid flowing from said inlet to the outlet is constrained to flow successively over the stationary baffles and under the movable baffles.

5. A variable volume separator comprising a settling vessel having side walls and a stationary top closure; a floating roof movable vertically within said vessel having pontoon means for floating on liquid in said vessel and having at least one part thereof submerged in said liquid and inclined to form a confined collecting space of reduced horizontal area for supernatant liquid, said roof having an opening at the top of said space to permit the escape of gas to the top of the vessel and said stationary top closure having a vent opening for the discharge of gas; an inlet for introducing a liquid mixture to be separated; an outlet for discharging settled denser liquid from said vessel; a skimmer in said collecting space carried by said floating roof for vertical movement therewith and having an elongate skimming edge for receiving supernatant liquid; a recovery vessel exterior to said settling vessel; and conduit means for drawing off supernatant liquid from said skimmer and transferring said liquid to the recovery vessel.

6. A variable volume separator comprising an elongate settling vessel having walls at least the upper portions of which extend vertically; a floating roof movable vertically within said walls having pontoon means for floating on liquid in said vessel, said roof having a pair of inclined walls at levels to be immersed in said liquid sloping to a ridge which extends the length of said vessel and forming a confined collecting space of reduced horizontal area immediately beneath said ridge; an inlet at one end of the vessel for introducing a liquid mixture to be separated; an outlet at the other end of said vessel for discharging settled denser liquid from vessel after traversing the length thereof; a skimming trough in said collecting space having a pair of elongate skimming edges extending longitudinally with respect to the vessel for receiving supernatant liquid for the major part of the length thereof, said trough being suspended from said roof; and a draw-off conduit for drawing off supernatant liquid from said skimming trough.

WILLIAM B. STEWART.

References Cited in the file of this patent

UNITED STATES PATENTS

| Number | Name | Date |
| --- | --- | --- |
| 418,984 | Parks, Jr. | Jan. 7, 1890 |
| 787,365 | Franey | Apr. 18, 1905 |
| 801,330 | Moore | Oct. 10, 1905 |
| 1,032,458 | White | July 16, 1912 |
| 1,450,545 | Hans | Apr. 3, 1923 |
| 1,636,866 | Kutzer | July 26, 1927 |
| 1,803,604 | Dudycha | May 5, 1931 |
| 1,919,689 | Elrod | July 25, 1933 |
| 2,003,819 | Archer | June 24, 1935 |
| 2,222,595 | Regester | Nov. 26, 1940 |

FOREIGN PATENTS

| Number | Country | Date |
| --- | --- | --- |
| 651,371 | France | Oct. 9, 1928 |
| 640,367 | Germany | Dec. 31, 1936 |